United States Patent [19]

Phipps

[11] Patent Number: 5,236,252
[45] Date of Patent: Aug. 17, 1993

[54] METHOD OF SKID DECTION WITHOUT SPEED SENSORS

[75] Inventor: Jack R. Phipps, Novi, Mich.

[73] Assignee: AlliedSignal Inc., Morristown, N.J.

[21] Appl. No.: 809,463

[22] Filed: Dec. 18, 1991

[51] Int. Cl.⁵ .............................................. B60T 13/18
[52] U.S. Cl. ...................................... 303/11; 303/93;
303/106; 303/DIG. 4; 364/426.02
[58] Field of Search ........................ 303/10, 11, 92, 93,
303/9.62, 105, 106, 116.1, DIG. 3, DIG. 4;
364/426.02

[56] References Cited

U.S. PATENT DOCUMENTS 5,067,778  11/1991  Testardi ................... 303/DIG. 4 X

*Primary Examiner*—Robert J. Oberleitner
*Assistant Examiner*—Lee W. Young
*Attorney, Agent, or Firm*—Markell Seitzman

[57] ABSTRACT

A method of controlling the operation of a vehicle brake system, the brake system including a master cylinder controlled by the operator of the vehicle to vary applied brake pressure to various brake mechanisms during normal service brake operation and an antiskid brake subsystem, activated when one or more vehicle wheels are skidding, for controlling brake pressure in the various brake mechanisms to permit various wheels to operate in a nonskidding manner. The method comprising the steps of: 1) determining and storing a control relationship which relates changes in vehicle deceleration and changes in applied brake pressure, with none of the wheels of the vehicle skidding, 2) subsequently measuring at least two values ($P_1 P_2$) of applied brake pressure to determine changes in applied brake pressure $\Delta P$ during a measurement interval and calculating the change in control deceleration $\Delta D_{ci}$ corresponding to the change $\Delta P$ in applied brake pressure utilizing the control relationship; directly measuring actual vehicle deceleration $D_i$; determining a change in actual vehicle deceleration $\Delta D_i$ corresponding to the change in applied brake pressure; determining if the change in actual vehicle deceleration over the measurement interval is inconsistent with the change in control deceleration; and if such inconsistancy is determined, reducing applied brake pressure to a determinable first level sufficient to cause actual vehicle deceleration to approach the control deceleration resulting from the reduced brake pressure.

17 Claims, 2 Drawing Sheets

METHOD OF SKID DECTION WITHOUT SPEED SENSORS

BACKGROUND AND SUMMARY OF THE INVENTION

The present invention relates to a simplified adaptive braking system that does not require wheel speed sensors.

Conventional antilock braking systems for road vehicles generally control braking action in response to a signal proportional to wheel speed. This signal is indicative of wheel slip, wheel acceleration and/or deceleration. Wheel speed is often generated by using wheel speed sensors and associated tone wheels for each controlled wheels or wheels of the vehicle. These wheel speed sensors are compared to control signals, the combination of which are utilized to sense wheel skid or impending skid and to appropriately control brake pressure so as to maintain the skidding wheel in a rotating condition. Ultimately one desires to control the skid and braking characteristic of each front and rear wheels of a vehicle such that each of the tires generate stopping forces which are as near the maximum attainable forces. These systems are characterized by the aforementioned wheel speed sensors and tone wheels, a plurality of isolation valves (in multi-channel systems), pressure decay valves and pressure release valves, which are each sequenced by a control unit. These all-wheel adaptive braking systems work adequately but present a relatively large cost to the vehicle owner.

Accordingly the invention comprises: A method and system for controlling the operation of vehicle brakes and associated wheels. The brake system includes a master cylinder controlled by the operator of the vehicle to vary applied brake pressure to various brake mechanisms during normal service brake operation and an antiskid brake subsystem, activated when one or more vehicle wheels are skidding, for controlling brake pressure in the various brake mechanisms to permit various wheels to operate in a nonskidding manner. The method comprises the steps of:

1.1) determining a control relationship k between vehicle deceleration and applied brake pressure, with none of the wheels of the vehicle skidding;

1.2) measuring at least two values ($P_1P_2$) of applied brake pressure to determine a change in applied brake pressure $\Delta P$ during a measurement interval;

1.3) calculating the change in control deceleration $\Delta D_{ci}$ corresponding to the change $\Delta P$ in applied brake pressure utilizing the control relationship;

1.4) directly measuring actual vehicle deceleration $D_i$;

1.5) determining a change in actual vehicle deceleration $\Delta D_i$ corresponding to the change in applied brake pressure;

1.6) determining if the change in actual vehicle deceleration over the measurement interval is inconsistent with the change in control deceleration; and if such inconsistancy is determined:

1.7) reducing applied brake pressure to a determinable first level sufficient to cause actual vehicle deceleration to approach the control deceleration resulting from the reduced brake pressure.

DETAILED DESCRIPTION OF THE DRAWINGS

Figure 1:
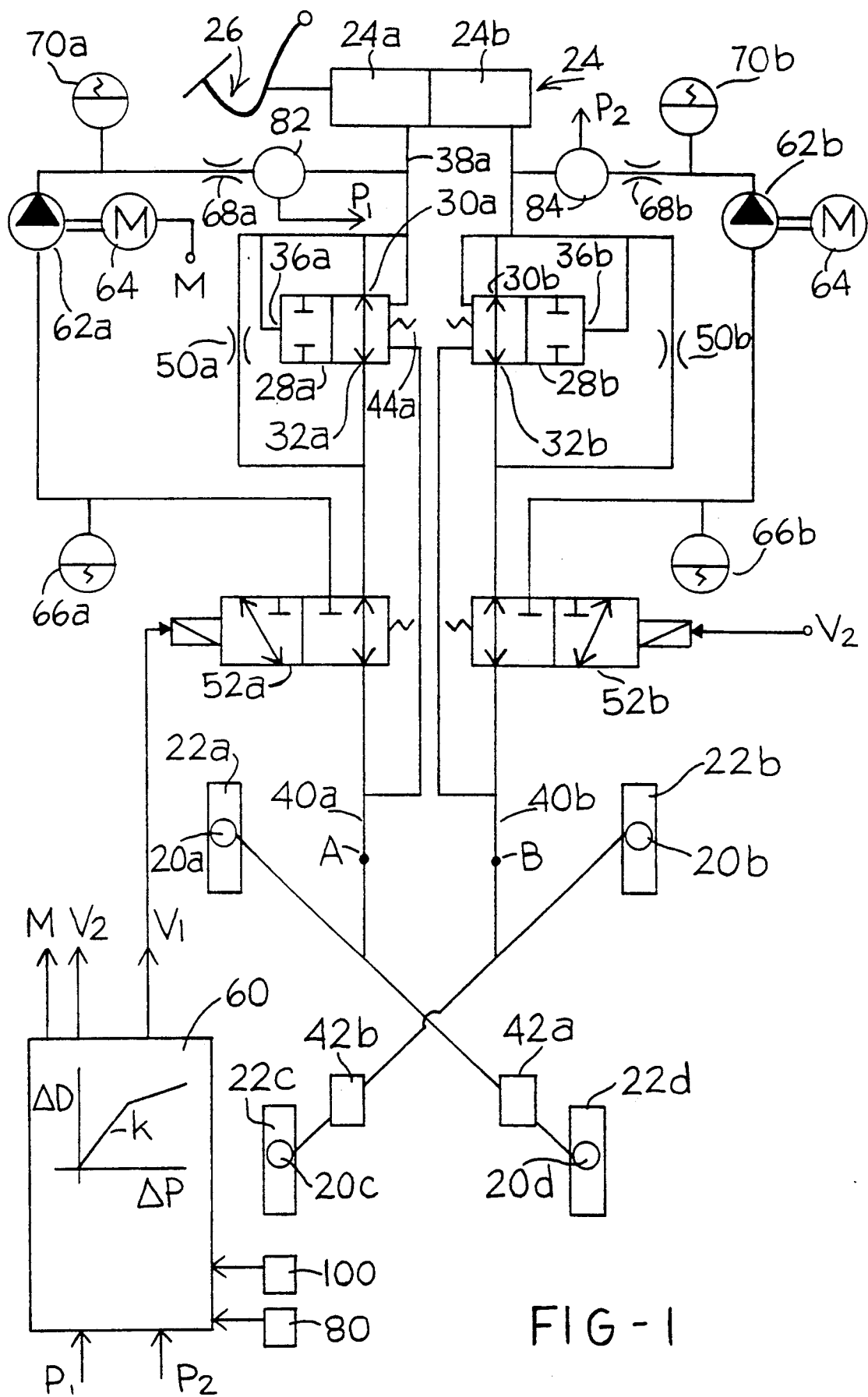
FIG. 1 illustrates a replenishment-type of antilock braking system.
Figure 2:
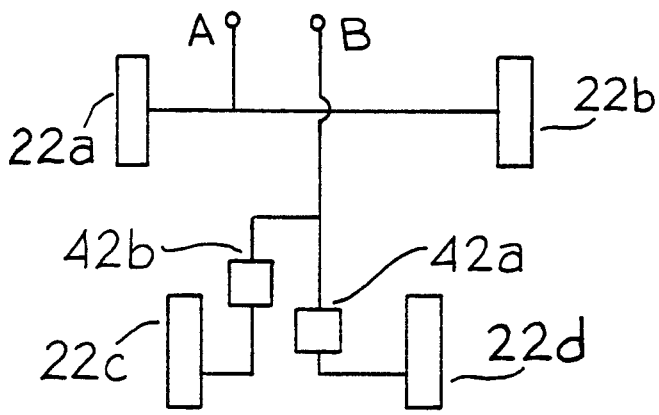
FIG. 2 illustrates an alternate braking system.

Reference is made to FIGS. 1 and 2, which illustrate a replenishment-type of antilock braking system. The braking system 20 of FIG. 1 controls the application of brake pressure to the front brake cylinders 20a and 20b and rear brake cylinders 20c and 20d arranged in a cross split orientation. The front and rear wheels of the vehicle are shown as 22a,b and 22c,d respectively. The brake system further includes a master cylinder 24 having a primary master cylinder chamber 24a and a secondary master cylinder chamber 24b. The number of chambers included within the master cylinder can vary with the specific hydraulic design of the brake system. Typically master cylinders include one, two or three chambers. A brake pedal 26 is used to activate the master cylinder in a known manner. The system 20 includes two identical control channels with elements designated as "a" and "b". Only one such channel will be described in detail below. The system or rather the first control channel includes a pressure responsive valve 28a. The valve 28a has a full flow condition illustrated in FIG. 1 and a no flow condition. Master cylinder fluid enters valve 28a at port 30a and exits at port 32a. Master cylinder pressure is received at port 36a through a hydraulic line 38a and wheel or brake cylinder pressure is communicated through hydraulic line 40a to port 42a. Valve 28a may also include a bias spring 44a. In the operation of valve 28a, it will be maintained in its full flow condition if the pressure or force generated by the master cylinder pressure is greater than the combined forces or pressures generated by hydraulic pressure of the wheel or brake cylinder and spring 44a.

Connected in parallel with valve 28a is an orifice 50a. The valve 28a is communicated to an electrically responsive build/decay valve 52a, the output of which is communicated to brake cylinders 20a and 20d. The build/decay valve 52a will change its state in response to a signal $V_1$ received on line 54a from an ECU 60. In response to this signal the build/decay valve 52a will communicate the brake cylinders 20a and 20d to a pump 62a driven by a motor 64. When the state of the build/decay valve 52a changes from that shown in FIG. 1, the hydraulic pressure within wheel cylinders 20a and 20d is permitted to decay as fluid is removed therefrom. To permit a rapid initial decay of brake pressure, a low pressure accumulator 66a is connected between the valve 52a and pump 62a. The output of pump 62a is communicated to the master cylinder chamber 24a through an orifice 68a. A high pressure accumulator 70a is connected in circuit between the pump and orifice 68a. The other brake cylinders 20b and 20c are controlled by similar structure such as a pressure responsive valve 28b, build/decay valve 52b, orifice 50b, and 68b, high pressure accumulator 70b, is moved by the motor 64. The various pumps such as 62a and 62b can be configured as adjoining pumping chambers in a dual pump mechanism driven by a single motor 64 (even though two motors have been schematically shown). Assuming that one motor 64 is used, energization of the motor is achieved by a motor signal M generated by the ECU. The motor energization signal M is generated upon sensing a skid condition.

Under normal operation of the system 20, with no wheels in a skid or impending skid condition, master cylinder pressure is communicated through valves 28a and 28b through the build/decay valves 52a and 52b to control the pressure in the various brake cylinders connected thereto. When a skid condition is sensed, the ECU generates the valve control signals $V_1$ and $V_2$ to cause one or both of the build/decay valves 52a and 52b respectively, to change state, thereby permitting brake pressure to decay. As the pressure in the various wheel cylinders 20a-20d reduce, the pressure responsive valves 28a and 28b will change state to a no flow condition. As is known in the art of adaptive braking or antilock systems, at some portion in the operating cycle it is desirable to build pressure in the various brake cylinders. Considering valve 52a, upon removal of the valve signal $V_1$, valve 52a returns to its flow condition, fluid from the pump 62a and high pressure accumulator 70a flows through orifice 68a and then through bypass orifice 50a into valve 52a thereby building pressure in brake cylinders 20a and 20b. The other components of the system will operate similarly in building the pressure in brake cylinders 20b and 20c. As can be appreciated, the purpose of the orifice 68a (as well as 68b) is to reduce pressure pulsations on the brake pedal 26 as additional fluid flows back into the various master cylinder chambers. The purpose of the orifice 50a is to limit the build rate of pressure thereby avoiding a premature lock up of the wheels which could result if pressure builds too quickly under control of the Pump 62a and high pressure accumulator 70a.

Reference is briefly made to FIG. 2. FIG. 2 illustrates an alternate braking system 20a which will utilize the various valves, pumps, motor and pressure accumulators as shown in FIG. 1. The difference between FIG. 1 and FIG. 2 is that the front brake cylinders 20a and 20b are controlled via the build/decay valve 52a, while the rear brake cylinders 20c and 20d are controlled through the build/decay valve 52b.

It should be noted that in the description of the system 20 that the system does not include wheel speed sensors as is typical in the prior art. The system 20 utilizes an accelerometer 80 communicated to the ECU 60 to sense vehicle deceleration. The ECU 60 may include digital filtering if needed. Such filtering techniques are known in the art.

Figure 3:
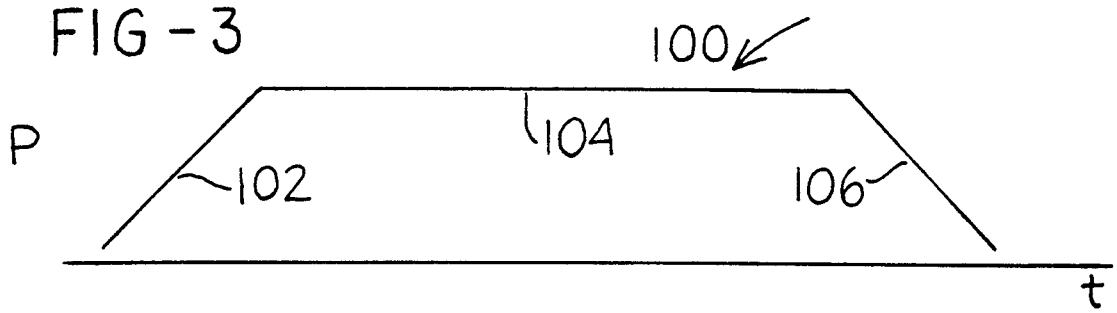
FIGS. 3 through 5 illustrate idealized time traces of various system parameters.
Figure 4:
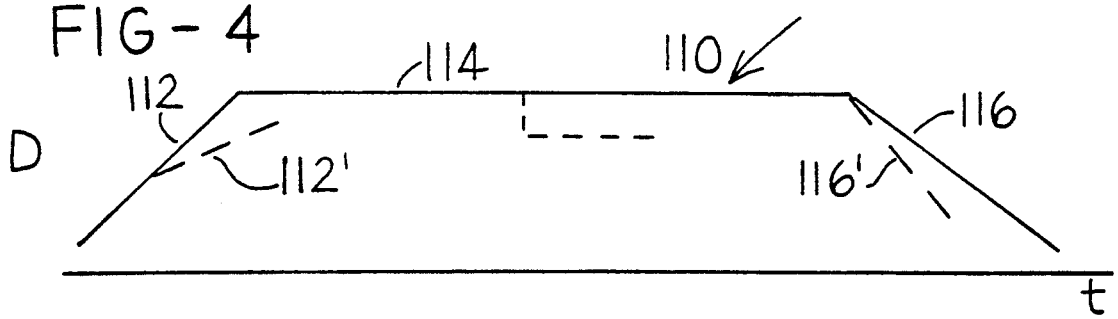
Figure 5:
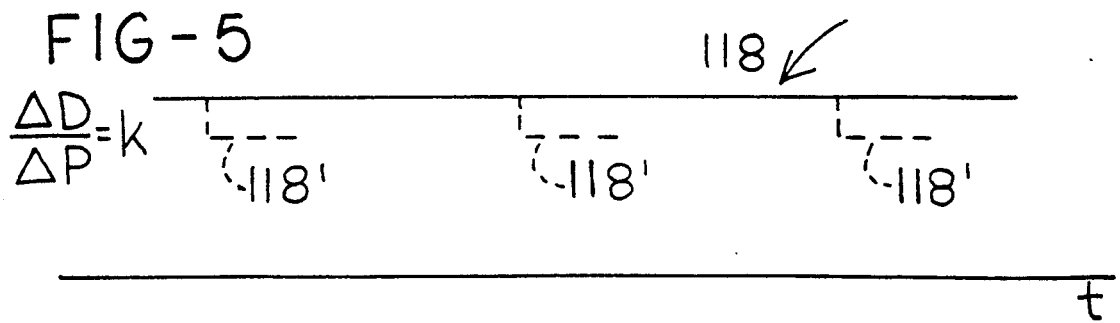

Reference is made to FIGS. 3 through 5. FIG. 3 illustrates a brake pressure profile 100. This pressure P is illustrative of the pressure generated in either of the master cylinder chambers 24a or 24b or alternatively the pressure generated in any of the brake cylinders 20a-20d. FIG. 3 illustrates three different possible conditions: increasing brake pressure, region 102; steady brake pressure, region 104; and decreasing brake pressure, region 106. FIG. 4 illustrates a deceleration (D) profile generally shown as 110. The deceleration profile applies to conditions at one particular wheel and not necessarily the entire vehicle. Vehicle deceleration, however, will generally follow the shape of this relationship. The deceleration profile comprises three regions. The first region 112 of increasing wheel deceleration corresponding to increasing brake pressure, the second region 114 of constant deceleration corresponding to region 104 and a third region 116 of decreasing deceleration corresponding to region 106 of decreasing brake pressure. If brake pressure P increases at a relatively constant rate, deceleration D will generally also increase at a constant rate. The ratio 118 of changes in wheel deceleration to changes in brake pressure is approximately constant k. Similarly, the ratio of changes in wheel deceleration $\Delta D$ to brake pressure $\Delta P$ for constant brake pressure or decreasing brake pressure remains essentially at the constant of proportionality k. This relationship is shown in FIG. 5 for normal service brake operation, that is, with none of the tires skidding. During normal operation of the system 20 or 20', the ECU 60 will monitor and store successive output values of accelerometer 80 as well as outputs of pressure sensors 82 and/or 84 to determine changes in brake pressure and changes in vehicle deceleration which will occur on the initial application of the brakes after start up of the vehicle. The pressure generated in either master cylinder chamber is virtually identical. For purposes of calculating the change in brake pressure the system will use the pressure generating the highest value of pressure. These intitial values are used to determine the constant of proportionality k. Even if any particular wheel should enter a skid condition during the initial application of the brake pedal 26, there should exist a sufficient amount of time for the ECU to establish this ratio k since none of the wheels will instantaneously enter into a skid condition. Having determined an initial value of the constant k, it is stored within the ECU for subsequent use.

Reference is again made to FIGS. 4 and 5 and in particular to the regions designated as 112', 114' and 116'. These regions show a reduction of the measured wheel deceleration, at a given applied pressure level, which is indicative that one or more of the wheels of the vehicle are skidding. When a tire begins to slide, its braking coefficient quickly decreases to a value of approximately 60% to 80% of the maximum attainable value depending upon tire/road interface assumptions. This change however, will depend upon the tire and road surface conditions. The effect of a skidding wheel will be reflected in the reduction of the ratio of the change in vehicle deceleration per change in brake pressure, i.e., $\Delta D_i/\Delta P_i$. As can be seen from FIG. 5, the reduction in deceleration will cause this ratio 118' to have a value less than the nominal value of the constant of proportionality k.

Experience has shown that the change in vehicle deceleration, as compared with the deceleration that can be achieved during normal non-skidding braking for one skidding rear wheel, will reduce approximately by four to five percent (4-5%). Similarly, if one front wheel begins to skid, this reduction in deceleration is approximately nine to ten percent (9-10%). This value of nine to ten percent would also be achieved if both rear wheels were skidding simultaneously. As can be appreciated, if both front wheels of the vehicle were in a skid condition, the reduction in achievable vehicle deceleration would reduce approximately twenty percent (20%). If all four wheels of the vehicle were skidding simultaneously, the reduction in achievable vehicle deceleration would reduce approximately thirty percent (30%).

The purpose of the present invention is to detect a change in vehicle deceleration $\Delta D_i$ and determine if that change is consistent with the measured change, if any, in brake pressure $\Delta P_i$, and thereafter to vary brake pressure in a manner to make subsequent changes in vehicle deceleration consistent with subsequent changes in brake pressure. The ECU 60 will sample and store various measured values of brake pressure and vehicle deceleration. The ECU will sample a number of values of brake pressure $P_i$ ($P_1$, $P_2$, $P_3$, $P_4$ ... $P_n$) and various values of vehicle deceleration $D_i$ ($D_1$, $D_2$, $D_3$, $D_4$ ... $D_n$) where $P_1$ and $D_1$ are the most current stored values of brake pressure and vehicle deceleration and $P_n$ and $D_n$ are the last values of stored pressure and deceleration. A sampling interval of ten or twenty milliseconds is adequate for most applications. Subsequently, the ECU will generate $\Delta D_i$ and $\Delta P_i$. As an example, this computation may be based on the two most current measured values of brake pressure and vehicle deceleration. However, since the vehicle will not instantaneously decelerate due to changes in brake pressure, for calculation purposes the ECU will generate a predetermined lag in its computations by comparing the two most current values of vehicle deceleration, i.e., $D_1$ and $D_2$ with earlier stored values of brake pressure such as $P_3$ and $P_4$. As such, the change in vehicle deceleration is equal to $\Delta D_i = D_1 - D_2$ and the change in brake pressure $\Delta P_i$ is equal to $P_3 - P_4$. Subsequently, this value of $\Delta D_i$ will be compared to a parameter called control deceleration, $\Delta D_{ci}$, wherein $\Delta D_{ci}$ is equal to:

$$\Delta D_{ci} = \Delta P_i * k \quad (1)$$

It should be appreciated that the value of the parameter $\Delta D_{ci}$ is the change in vehicle deceleration that would exist for a given change in brake pressure with no wheels skidding. If $\Delta D_i$ is less than the value $\Delta D_{ci}$, such condition indicates that one or more of the vehicle wheels are in a skid condition and corrective action must be initiated. The nominal value k which is also called the control relationship can be initially stored in the ECU based upon prior testing of a similar vehicle. Alternatively, the value of k can be determined from measured changes in brake pressure and vehicle deceleration. As mentioned above, a wheel of the vehicle will not enter into a skid condition instantaneously. The ECU will set the nominal value k equal to $\Delta D_i / \Delta P_i$ as determined during the initial application of the brakes after the vehicle engine has been started. In this manner the ECU 60 will generate a different constant k which will implicitly include variations due to vehicle loading. Subsequently the ECU determines the parameter $\Delta D_i$ and compares same with the parameter $\Delta D_{ci}$.

Upon determining that the value of $\Delta D_i$ is less than $\Delta D_{ci}$ by a predetermined value, the ECU institutes corrective actions. Returning briefly to FIG. 1. In system 20 the brake cylinders have been connected to their respective build/decay valves 52a and 52b in a cross-split manner. In this type of a system when either of the build/decay valves 52a or 52b are excited by their respective energization signals $V_1$ and $V_2$, it can be seen that the pressure within one front brake cylinder such as 20a and one rear cylinder such as 20d, will decrease. As can be appreciated, this type of system cannot be used to compensate only for the condition in which only one or both of the rear wheels 22c and 22d are in a skid condition.

As previously mentioned, actual or measured vehicle deceleration will be reduced by about 4-5% for each rear skidding wheel and by at least 10% for each front skidding wheel. Since system 20 cannot control any of the rear wheels independently, the system will initiate an antilock cycle when actual vehicle deceleration is about 10% less than control deceleration. In this situation and under control of system 20, all four wheels, that is all four brake cylinders, 20a-20d, would be controlled simultaneously. Upon detecting a variation of ten percent or greater in the parameter $\Delta D_i$, the ECU issues the valve control commands $V_1$ and $V_2$ to their respective build/decay valves 52a and 52b, thereby shuttling these valves to their decay state in which the various brake cylinders are communicated to the respective pumps and low pressure accumulators, 60a, 66a, and 62b and 66b. This action permits the initial rapid decay of all brake cylinder pressure. The ECU continues to monitor brake cylinder (or master cylinder pressure) until such pressure reduces to a first pressure level or value. Such initial decay in brake pressure would be approximately sixty percent (60%) of the previous level of brake pressure that existed prior to sensing the reduced value in actual vehicle deceleration.

Thereafter, the ECU would maintain this reduced level of brake pressure for a predetermined fixed time interval. During this time the ECU continues to compute the parameter $\Delta D_i$, i.e. a change in actual vehicle deceleration. If $\Delta D_i$ increases relative to the control deceleration $\Delta D_{ci}$, then the valve control signals $V_1$ and $V_2$ are removed, thereby causing the build/decay valves 52a and 52b to return to the state as illustrated in FIG. 1 wherein pressure is now permitted to increase as brake fluid flows from the various pumps and high pressure accumulators through the respective orifices 50a and 50b. As mentioned above, the orifices 50a and 50b reduce the rate of pressure build so that the previously skidding wheels will not re-enter a skid condition due to an abrupt increase in brake pressure. If upon reduction of the brake pressure to the first pressure level or value, the subsequently determined parameter $\Delta D_i$ shows no increase toward the control deceleration, then the ECU will maintain the build/decay valves 52a and 52b in their decay state slightly longer to permit the brake pressure to reduce further such as to a value of approximately seventy percent (70%) of the initial brake pressure. Thereafter, this reduced value of brake pressure will be maintained until a subsequent value of $\Delta D_i$ shows an increase, whereupon pressure will be reapplied to the various brake cylinders in the manner as described above.

If during the reapply process, the then current value of parameter $\Delta D_i$ reduces in magnitude, thus indicating that at least one of the wheels of the vehicle is skidding, the reapply process is terminated and the brake pressure is again reduced. If however, during the reapply process the value of $\Delta D_i$ increases toward the value of the control deceleration value then the brake pressure is permitted to increase until no further change is detected and $\Delta D_i$ is within allowable limits of control deceleration.

Reference is again made to FIG. 2 which illustrates the alternate system 20'. As may be recalled, this system is capable of releasing the brake pressure in the front wheels and in the rear wheels separately under control of the various build/decay valves 52a and 52b. Consider for the moment that the vehicle is operating in a condition where the then current value of $\Delta D_i$ is approximately ten percent (10%) less than the current value of control deceleration $\Delta D_{ci}$. In this situation, the ECU cannot initially determine whether or not a single front wheel or both rear wheels are skidding. It should be recalled that a single skidding front wheel will reduced vehicle deceleration by 9-10% and each rear wheel would contribute to a reduction of 4-5%. In such a condition, the ECU upon determining that the parameter $\Delta D_i$ is ten percent (10%) below the control deceleration parameter $\Delta D_{ci}$, decreases the pressure but only in the rear brakes by energizing the build/decay valve 52b. The brake pressure in the rear brakes would be reduced in the similar manner as described above to approximately sixty percent (60%) of the previous value of rear brake pressure. This value of rear brake pressure is maintained for a predetermined period of time. During a subsequent measurement interval, the then current value of the parameter $\Delta D_i$ is compared to the control deceleration. If the parameter $\Delta D_i$ remained constant, by implication it can be concluded that neither of the rear wheels were skidding and that at least one of the front wheels was skidding. Subsequently, the build-/decay valve 52b would be returned to the condition shown in FIG. 1 causing the controlled reapply of the rear brakes and relatively simultaneously, the build-/decay valve 52a would be placed in its decay state causing a reduction in the pressure of both front wheels. As system 20' can control the rear brakes independently of the front brakes if the reduction in $\Delta D_i$ is approximately 4-5% the ECU would generate signal $V_2$ to activate valve 52b to only reduce rear brake pressure in the manner described above. As may be recalled a reduction of this amount in the parameter $\Delta D_i$ is indicative of a single rear wheel skidding. As system 20' cannot be used to reduce rear pressure to a single rear brake cylinder, the above action will reduce the brake pressure in both rear brake cylinders 20c and 20d. While this action will reduce the braking effectiveness of the non-skidding rear wheel the overall effect of this reduction on vehicle performance should be nominal while yielding an improvement in stability.

It should be appreciated that if a brake system were to respond to a condition wherein only one of the rear brakes was in a skid condition, then at least the system must be able to decrease the pressure in each rear brake cylinder 20c and 20d separately. While this type of system is not illustrated herein, such a system would replicate one of the channels shown in FIG. 1 and would include an additional pump, high pressure and low pressure accumulator, pressure responsive valve, build/decay valve and various orifices.

A more sophisticated braking system can be defined by incorporating a lateral skid sensor such as a vehicle rotation sensor to sense vehicle rotation about its center of gravity. Such a sensor could be gyroscope 100. If the rotational rate output from sensor 100 is greater than the rate which would be generated when a vehicle is traversing a curve such condition is indicative that the one or both of the rear wheels have begun to skid. In this situation the pressure in both rear wheels would be reduced in the manner described above.

Many changes and modifications in the above described embodiment of the invention can, of course, be carried out without departing from the scope thereof. Accordingly, that scope is intended to be limited only by the scope of the appended claims.

I claim:

1. A method of controlling the operation of a vehicle brake system, the brake system including first pressure means, including a master cylinder controlled by the operator of the vehicle, to vary applied brake pressure to various brake mechanisms during normal service brake operation and an antiskid brake subsystem, activated when at least one vehicle wheels are skidding, for controlling the reduction and build in brake pressure in the various brake mechanisms to permit wheels of the vehicle to operate in a nonskidding manner; the method comprising the steps of:
   a. determining and storing a control relationship (k) between vehicle deceleration change and applied brake pressure change, with none of the wheels of the vehicle skidding;
   b. measuring at least two values ($P_1$, $P_2$) of applied brake pressure to determine a change in applied brake pressure ($\Delta P$) during a measurement interval;
   c. calculating the change in control deceleration ($\Delta Dci$) corresponding to the change ($\Delta P$) in applied brake pressure utilizing the control; relationship
   d. providing a signal indicative of actual vehicle deceleration ($d_a$);
   e. determining a change in actual vehicle deceleration ($\Delta D_i$) corresponding to the change in applied brake pressure;
   f. determining if the change in actual vehicle deceleration over the measurement interval is inconsistent with the change in control deceleration; and if such inconsistency is determined;
   g. reducing applied brake pressure to a determinable first level sufficient to cause actual vehicle deceleration to approach the control deceleration resulting from the reduced brake pressure.

2. The method as defined in claim 1 wherein step f comprises the steps of:
   h. comparing actual vehicle deceleration ($\Delta D_i$) to the control deceleration ($\Delta D_{ci}$);
   i. determining if actual vehicle deceleration is less than the control deceleration by a first amount.

3. The method as defined in claim 2 wherein the first amount within a range of about approximately 4 to 5 percent.

4. The method as defined in claim 2 including the step(s) of:
   j. maintaining applied brake pressure at the first level;
   k. determining a subsequent change of actual vehicle deceleration over the measurement interval;
   l. calculating the corresponding subsequent change of control deceleration at the first level over the same time interval;
   m. comparing changes in actual vehicle deceleration to the change in control deceleration;
   n. if the change in actual vehicle deceleration is less than the change in the control deceleration, decreasing applied brake pressure further to a second level;
   o. if the change in actual vehicle deceleration is generally equal to than the change in control deceleration, maintaining applied brake pressure at the first level;
   p. if the change in actual vehicle deceleration is greater than the change in control deceleration, increasing applied brake pressure above the first level.

5. The method as defined in claim 1 wherein the antiskid brake subsystem comprises control means such that the level of applied brake fluid pressure communication at each brake mechanism can be varied relatively simultaneously, wherein step g. includes the step of:
   q. causing the antiskid subsystem to reduce the applied brake pressure to each brake mechanism relatively simultaneously.

6. The method as defined in claim 5 wherein the first level to which applied brake pressure is reduced is proportional to the difference in the change in the actual vehicle and change in control deceleration.

7. The method as defined in claim 2 wherein the antiskid brake subsystem comprises at least two control channels, a first control channel controlling pressure in front brake mechanisms associated with front wheels of the vehicle and a second control channel controlling pressure in rear brake mechanisms associated with rear wheels of the vehicle, wherein step g. includes the steps of:
  r. reducing applied brake pressure supplied to the rear brake mechanisms to the first level and maintaining applied brake pressure to the front brake mechanisms;
  s. determining any change in actual vehicle deceleration over the measurement internal;
  t. calculating the corresponding change of control deceleration at the reduced applied brake pressure level over the same measurement interval; and if the change in actual vehicle deceleration remains less than the change in control deceleration;
  u. reducing the applied brake pressure to the front brake mechanisms to a reduced second pressure level.

8. The method as defined in claim 7 including the step of:
  v. increasing the brake pressure applied to the rear brake mechanisms.

9. The method as defined in claim 7 including the steps of:
  w. comparing subsequent changes in actual vehicle deceleration to subsequent changes in control deceleration;
  x. adjusting applied brake pressure such that subsequent changes in vehicle deceleration, at the then current level of applied brake pressure, are substantially identical to changes in control deceleration.

10. The method as defined in claim 2 wherein the vehicle includes sensing means for generating a signal indicative of lateral motion of the vehicle and means for determining if such lateral motion has exceed a limit value generally indicative of a sideways skidding vehicular motion, the method including the step of:
  y. reducing applied brake pressure to the rear brake mechanisms after such limit value has been exceeded.

11. The method as defined in claim 9 wherein if the relative difference between the actual vehicle deceleration and command deceleration is approximately equal the first amount, reducing the applied brake pressure only to in the rear brake mechanisms.

12. The method as defined in claim 11 wherein the first amount within a range of about approximately 4 to 5 percent.

13. The method as defined in claim 9 wherein if the relative difference between the actual vehicle deceleration is approximately a second amount reducing the applied brake pressure in the rear brake mechanisms if such a reduction in the applied brake pressure is insufficient to cause the actual vehicle deceleration to follow corresponding change in the control deceleration then decrease the applied brake pressure in the front brake mechanisms.

14. The method as defined in claim 11 wherein the second amount within a range of about approximately 9 to 10 percent.

15. The method as defined in claim 9 wherein if the relative difference between the actual vehicle deceleration is a third amount or greater simultaneously reducing the applied brake pressure to both the front and rear brake mechanisms.

16. The method as defined in claim 15 wherein the third amount in within a range of about approximately 20 percent.

17. The method as defined in claim 1 wherein the control relationship is proportional to vehicle loading.

* * * * *